United States Patent [19]

Granger

[11] Patent Number: 4,708,041
[45] Date of Patent: Nov. 24, 1987

[54] LATHE MOUNTING APPARATUS

[76] Inventor: Robert A. Granger, 1257 Britain Dr., Lawrenceville, Ga. 30245

[21] Appl. No.: 900,450

[22] Filed: Aug. 26, 1986

[51] Int. Cl.$^4$ .............. B23B 31/00; B23B 33/00; B23B 5/02
[52] U.S. Cl. .................. 82/40 R; 51/168; 51/237 R; 82/4 A; 269/52; 279/1 L; 409/234
[58] Field of Search .......... 82/4 A, 40 R; 51/168, 51/236, 237; 269/47, 52; 279/1 L, 1 A, 1 W; 403/1, 19, 26, 360; 409/232, 234

[56] References Cited

U.S. PATENT DOCUMENTS

| 1,235,957 | 8/1917 | Bidwell | 269/52 |
| 1,733,578 | 10/1929 | Burke | 82/4 A |
| 1,830,723 | 11/1931 | Steiner | 51/165 R |
| 2,011,940 | 8/1935 | Myers | 82/4 A |
| 2,255,885 | 9/1941 | Herbst | 51/168 |
| 2,398,278 | 4/1946 | Bailey | 82/34 R |
| 2,434,498 | 1/1948 | Klassett | 82/4 A |
| 2,542,616 | 2/1951 | Barrett | 82/4 A |
| 2,923,193 | 2/1960 | Schaid | 82/34 R |
| 3,038,356 | 6/1962 | Atzberger | 82/4 A |
| 4,165,662 | 8/1972 | Besenbruch et al. | 82/4 A |

Primary Examiner—Nicholas P. Godici
Assistant Examiner—Jerry Kearns
Attorney, Agent, or Firm—Bailey & Hardaway

[57] ABSTRACT

A lathe-mounting apparatus defining a cylindrical core having an enlarged cylindrical termination at one end thereof and a separate slidably-mounted cone at the opposite end. The cone is adapted to slide onto the smaller end of the cylindrical core, the smaller end of the cone preceding the larger end, whereby a brake disk, or other similarly shaped cylindrical article, mounted on the cylindrical core between the enlarged termination and the cone, may be cut or resurfaced without significant vibration during rotation of the article.

3 Claims, 4 Drawing Figures

LATHE MOUNTING APPARATUS

FIELD OF THE INVENTION

This invention relates to an apparatus for mounting articles, such as a brake disk, brake rotor or brake drum, on a lathe.

PRIOR ART

It is common in the art to mount an article on a lathe by securing it between or against one or more cones. A typical form of the prior art has two cones, the smaller ends thereof facing together at least one of which is slidably mounted on a spindle whereby an article having a hole there through may be secured between the two cones.

Using an apparatus of the prior art, a significant problem associated with cutting or refinishing the article mounted on the spindle arises from vibration created during rotation of the article while the cutting force is simultaneously exerted. Such vibration creates undesirable imperfections in the refinished surface. Notwithstanding many years of research and numerous improvements in screw machines, lathes and the like, the problem with vibration during operation has not been eliminated.

SUMMARY OF THE INVENTION

An important feature of my invention involves replacement of one of the cones with an alternative member described below, to which I will refer to a roto-hub. An article secured between the roto-hub and a slidably mounted cone may be cut or refinished while being rotated on a lathe spindle while experiencing a significant reduction of the vibration normally created by such operation. The resulting cut or refinished surface, therefore, contains fewer imperfections thereby reducing the time and cost required to smooth the surface.

My invention is comprised essentially of a roto-hub, defined as a hollow cylindrical core having an enlarged cylindrical termination at one end thereof, said termination defining a hollow cylindrical recess concentric with the core and the termination, the hollow of the core being adapted for mounting on a lathe spindle; a hollow conical member, or cone, having a small end and a large end, slidably and matingly engaging the core with the small end thereof received within the hollow of the termination, whereby an article can be adjustably mounted between the termination and the conical member.

It will be obvious to those skilled in the art that the particular dimension of the roto-hub and cone may be infinitely varied without altering the unique concept of my invention.

In the preferred form of my invention, chamfer has been added to the inner and outer edges of each end of the cylindrical core to promote ease of mounting of both the lathe mounting apparatus onto the spindle and an article onto the lathe mounting apparatus, and for more perfect centering of rotor or drum articles.

The smaller end of the core opposite the roto-hub also has a first concentric groove extending from the termination of the smaller end to a distance almost half the length of the core. The first groove further improves the ease of mounting of an article onto the lathe mounting apparatus.

Another feature of the preferred form of my invention is a second concentric groove in the outer surface of the cylindrical core at the point of connection between the enlarged cylindrical termination and the cylindrical core.

DESCRIPTION OF DRAWINGS

Referring to the drawings.

DESCRIPTION OF THE PREFERRED FORM OF INVENTION

Figure 2:
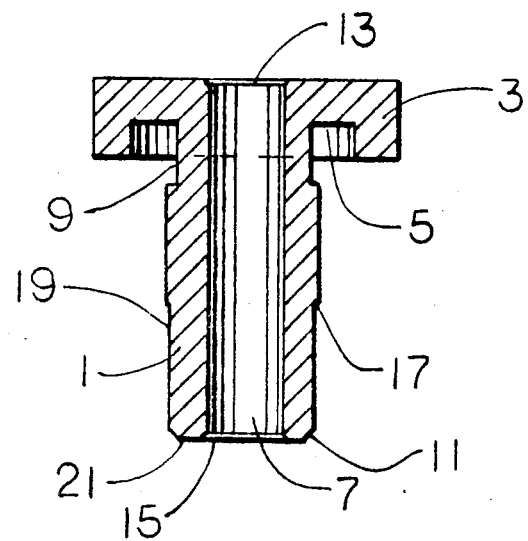
FIG. 2 shows a longitudinal section of the cylindrical core and the enlarged cylindrical termination.

Referring now to FIG. 2, the hollow cylindrical core of my lathe mounting apparatus is designated by numeral 1 and the cylindrical hollow of the core is designated by numeral 7. A concentric groove 9 is cut into the outer surface of the core 1 at the point of connection with an enlarged cylindrical termination 3, the termination 3 having a hollow cylindrical recess 5 concentric with the core 1 and the termination 3. The smaller termination 21 of the core 1 also has a concentric groove 19 extending from the smaller termination 21 to a concentric chamfer 17 located near the middle of the core 1. A concentric chamfer 15 appears at the smaller termination 21 of the hollow of the core 7, and a concentric chamfer 13 appears at the enlarged cylindrical termination 3 of the hollow of the core 7.

A concentric chamfer 11 also appears at the smaller termination 21 on the outer surface of the core 1.

It will be clear to those skilled in the art that the chamfer 13 and chamfer 15 will improve the ease of mounting the apparatus onto a lathe spindle, while the chamfer 11 and chamfer 17 will assist the user in sliding a properly adapted conical member onto the smaller end 21 of the cylindrical core 1.

Figure 1:
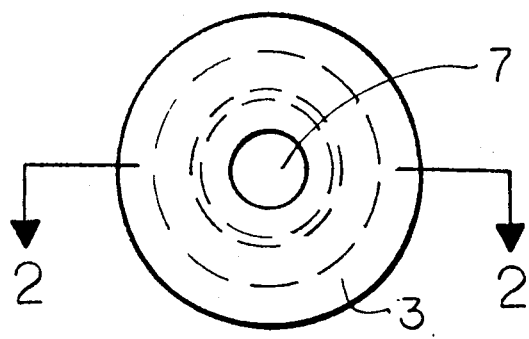
FIG. 1 is a longitudinal view of the enlarged cylindrical termination in the preferred form of my invention.

FIG. 1 shows the same elements from a longitudinal view of the enlarged cylindrical termination, as those described above in FIG. 2. FIG. 2 clearly shows the cylindrical configuration of the preferred form of my invention.

Figure 3:
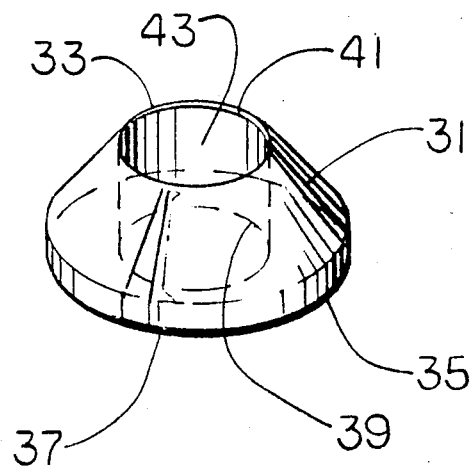
FIG. 3 is a perspective view of the conical member.

Referring now to FIG. 3, the hollow conical member 31 defines a cylindrical hollow 43 extending there through from the smaller end 33 to the larger end 35. The concentric chamfer 39 appears at the larger end 35 of the hollow 43 of the cone, and a similar chamfer 41 appears at the smaller end 33 of the hollow 43 of the cone. It is obvious to those skilled in the art that chamfer of this nature will significantly improve the ease with which the cone may be slidably mounted onto the smaller termination of the core. A third chamfer 37 appears at the larger end 35 on the outer surface of the cone 31.

Figure 4:
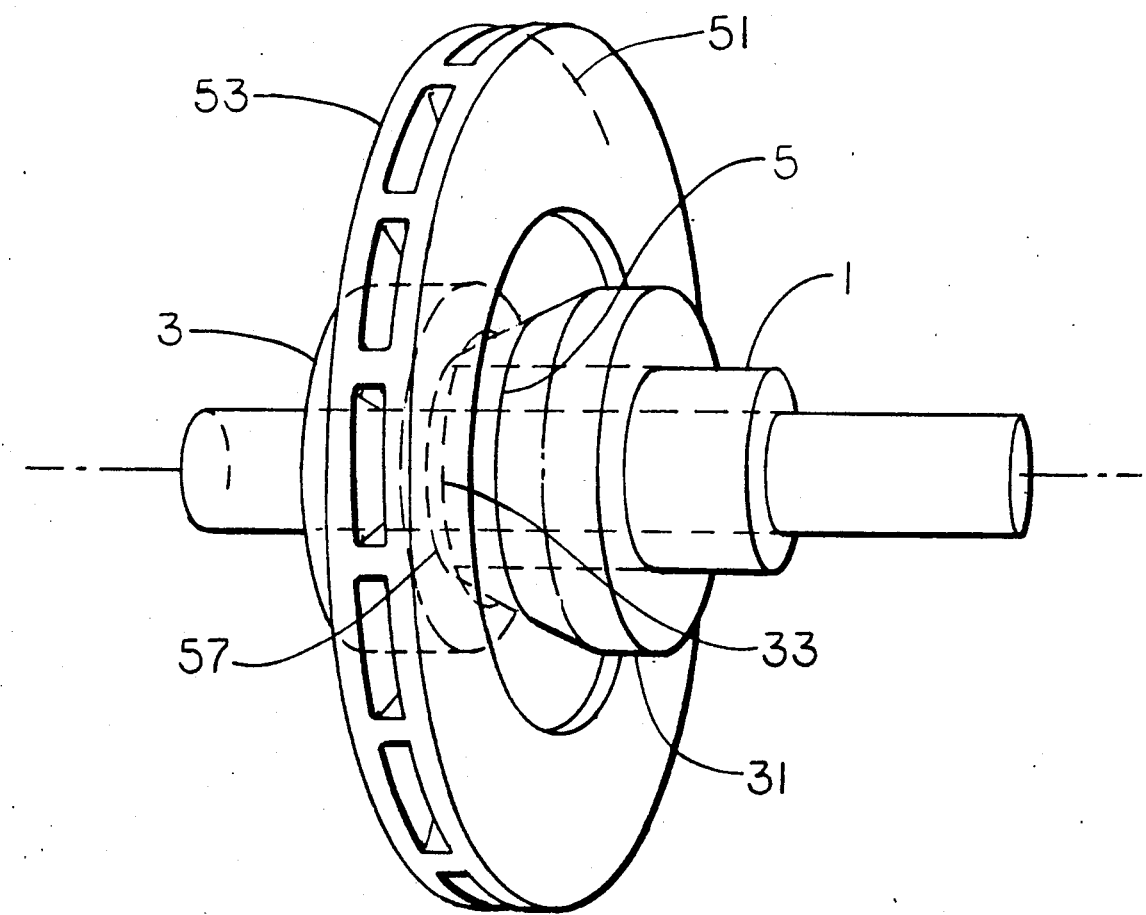
FIG. 4 is a perspective view of a cylindrical disk clamped onto the lathe mounting apparatus.

FIG. 4 depicts a cylindrical disk 51 having a cylindrical hollow 57 extending there through from a flat rear surface 53 to a flat front surface 55, the disk being mounted on a roto-hub and being supported on the rear surface 53 by the enlarged cylindrical termination 3. The cylindrical core 1 extends through the hollow 57 of the disk 51. A conical member 31 is slidably mounted onto the core 1 and is secured against the disk 51, the smaller end 33 of the core 31 extending through the hollow 57 of the disk 51 beyond the rear surface 53 and into the recess 5 of the enlarged cylindrical termination 3. The roto-hub and disk 51 may then be rotated together about the longitudinal axis of the cylindrical core 1, the disk 51 being held firmly in place by the force of the enlarged cylindrical termination 3 against the rear surface 53 and the force of the conical member 31 against the surface of the hollow 57 of the disk 51.

Based on the above, I believe that my invention will be clearly understood.

I claim:

1. A lathe mounting apparatus comprising:
a hollow cylindrical core having an enlarged cylindrical termination at one end thereof, said enlarged cylindrical termination defining a hollow cylindrical recess concentric with said core and said termination, the hollow of said core being adapted for mounting on a lathe spindle, and a hollow conical member having a small end and a large end slidably and matingly engaging said core with the small end thereof received within the hollow of said termination, whereby an article can be adjustably mounted between said termination and said conical member.

2. A lathe mounting apparatus as in claim 1, wherein chamfer has been added to the inner and outer edges of each end of the hollow cylindrical core.

3. A lathe mounting apparatus as in claim 1, having a second concentric groove in the outer surface of the cylindrical core at the point of connection between the enlarged cylindrical termination and the cylindrical core.

* * * * *